(12) United States Patent
Sayed Hassan et al.

(10) Patent No.: US 12,695,579 B2
(45) Date of Patent: Jul. 28, 2026

(54) PHASE CONTINUITY TRACKING

(71) Applicant: Nokia Technologies Oy, Espoo (FI)

(72) Inventors: Mohamad Sayed Hassan, Massy (FR); Marco Maso, Massy (FR); Kari Pekka Pajukoski, Oulu (FI)

(73) Assignee: Nokia Technologies Oy, Espoo (FI)

( * ) Notice: Subject to any disclaimer, the term of this patent is extended or adjusted under 35 U.S.C. 154(b) by 296 days.

(21) Appl. No.: 18/569,102

(22) PCT Filed: Jul. 22, 2022

(86) PCT No.: PCT/FI2022/050503
§ 371 (c)(1),
(2) Date: Dec. 11, 2023

(87) PCT Pub. No.: WO2023/012404
PCT Pub. Date: Feb. 9, 2023

(65) Prior Publication Data
US 2024/0214167 A1      Jun. 27, 2024

(30) Foreign Application Priority Data
Aug. 6, 2021      (FI) ...................................... 20215841

(51) Int. Cl.
H04L 5/00            (2006.01)
(52) U.S. Cl.
CPC .......... H04L 5/0058 (2013.01); H04L 5/0051 (2013.01)
(58) Field of Classification Search
CPC ............................ H04L 5/0058; H04L 5/0051
USPC ........................................................ 370/329
See application file for complete search history.

(56) References Cited

U.S. PATENT DOCUMENTS

| | | | |
|---|---|---|---|
| 9,300,370 | B2 | 3/2016 | Gaal |
| 10,608,779 | B2 | 3/2020 | Sun et al. |
| 10,944,454 | B2 | 3/2021 | Kim et al. |
| 2019/0230656 | A1 | 7/2019 | Soriaga et al. |
| 2020/0052840 | A1 | 2/2020 | Hasegawa et al. |
| 2020/0106590 | A1 | 4/2020 | Bharadwaj et al. |
| 2020/0366436 | A1 | 11/2020 | Molés Cases et al. |
| 2021/0014095 | A1 | 1/2021 | Ly et al. |
| 2021/0112501 | A1 | 4/2021 | Dinan et al. |
| 2021/0168011 | A1 | 6/2021 | Davydov et al. |
| 2021/0194558 | A1 | 6/2021 | Venugopal et al. |
| 2022/0231886 | A1* | 7/2022 | Ly .................... H04W 72/0446 |

(Continued)

FOREIGN PATENT DOCUMENTS

| | | |
|---|---|---|
| EP | 3700267 A1 | 8/2020 |
| WO | 2021/051416 A1 | 3/2021 |

OTHER PUBLICATIONS

U.S. Appl. No. 63/137,860, filed Jan. 15, 2021.*

(Continued)

*Primary Examiner* — Faisal Choudhury
(74) *Attorney, Agent, or Firm* — Barta Jones, PLLC

(57)                ABSTRACT

Certain examples of the present disclosure relate to tracking phase continuity, for example for De-Modulation Reference Signals for channel estimation using Joint Channel Estimation. Certain examples provide a User Equipment, UE, (110) comprising means (11) for: determining whether a coherence criterion has been met; selecting, based at least in part on the determination, a Reference Signal, RS, arrangement (301); and transmitting an RS (300) having the selected RS arrangement.

14 Claims, 3 Drawing Sheets

(56) References Cited

U.S. PATENT DOCUMENTS

| | | | |
|---|---|---|---|
| 2022/0247601 A1* | 8/2022 | Sridharan | H04L 5/0051 |
| 2022/0312409 A1* | 9/2022 | Taherzadeh Boroujeni | H04W 24/08 |
| 2022/0338276 A1* | 10/2022 | Taherzadeh Boroujeni | H04L 5/0051 |
| 2024/0007247 A1* | 1/2024 | Ly | H04W 72/232 |
| 2024/0333557 A1* | 10/2024 | Ly | H04L 5/0051 |
| 2025/0096940 A1* | 3/2025 | Sridharan | H04L 1/08 |

OTHER PUBLICATIONS

Extended European Search Report received for corresponding European Patent Application No. 22852396.5, dated Jul. 23, 2025, 10 pages.

"Discussion on Joint channel estimation for PUSCH", 3GPP TSG RAN WG1 Meeting #104bis-e, R1-2102313, Huawei, Agenda Item: 8.8.1.3, Apr. 12-20, 2021, 8 pages.

"3rd Generation Partnership Project; Technical Specification Group Radio Access Network; NR; Physical layer procedures for data (Release 16)", 3GPP TS 38.214, V16.6.0, Jun. 2021, pp. 1-172.

"Joint channel estimation for PUSCH", 3GPP TSG-RAN WG1 Meeting #105e, R1-2104687, Agenda: 8.8.1.3, Qualcomm Incorporated, May 10-27, 2021, 9 pages.

"Type A PUSCH repetitions for Msg3", 3GPP TSG RAN WG1 #104-e, R1-2101225, Agenda: 8.8.3, Samsung, Jan. 25-Feb. 5, 2021, pp. 1-4.

Scripcaru et al., "On the potential of phase diagram analysis to identify the wide band modulations", 13th International Conference on Communications (COMM), Jun. 18-20, 2020, pp. 55-58.

"3rd Generation Partnership Project; Technical Specification Group Radio Access Network; NR; Physical channels and modulation (Release 15)", 3GPP TS 38.211, V15.3.0, Sep. 2018, pp. 1-96.

"3rd Generation Partnership Project; Technical Specification Group Radio Access Network; Evolved Universal Terrestrial Radio Access (E-UTRA); Physical channels and modulation (Release 15)", 3GPP TS 36.211, V15.3.0, Sep. 2018, pp. 1-237.

Office action received for corresponding Finnish Patent Application No. 20215841, dated Mar. 4, 2022, 7 pages.

"Joint channel estimation for PUSCH coverage enhancements", 3GPP TSG RAN WG1 #106-e, R1-2106657, Agenda: 8.8.1.3, Nokia, Aug. 16-27, 2021, 18 pages.

International Search Report and Written Opinion received for corresponding Patent Cooperation Treaty Application No. PCT/FI2022/050503, dated Oct. 13, 2022, 16 pages.

"3rd Generation Partnership Project; Technical Specification Group Radio Access Network; Study on NR coverage enhancements (Release 17)", 3GPP TR 38.830, V17.0.0, Dec. 2020, pp. 1-91.

* cited by examiner

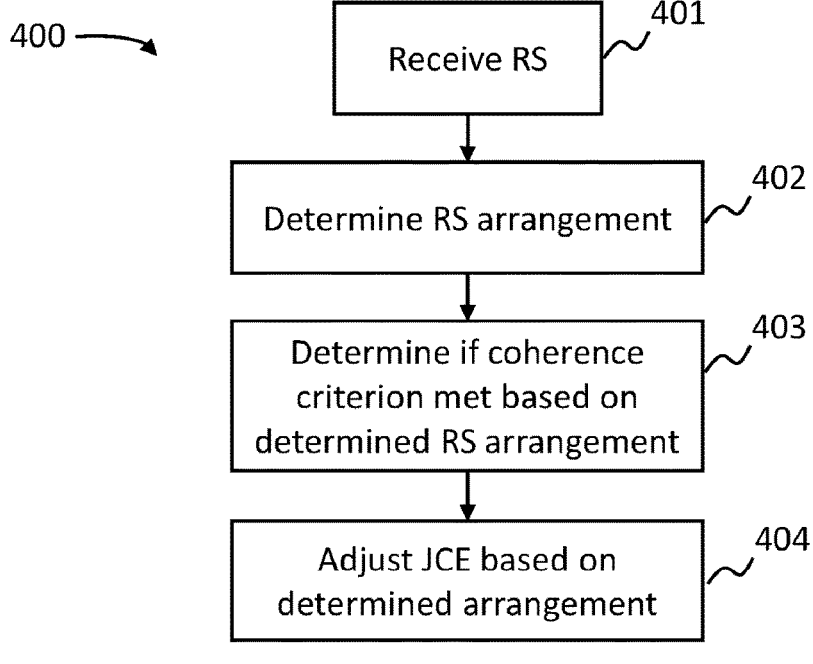
FIG. 4
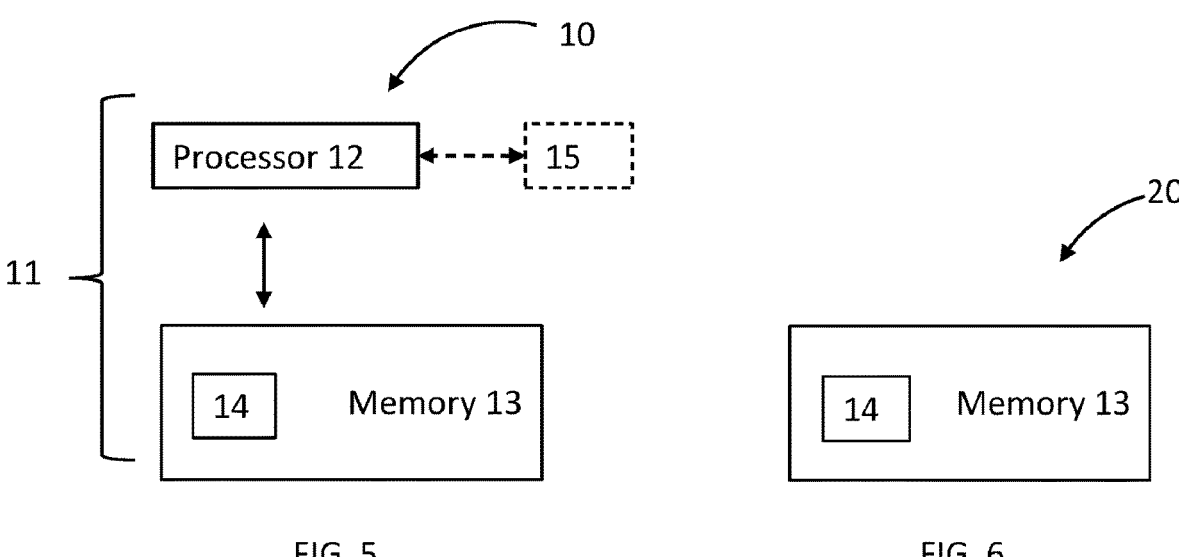
FIG. 5                                         FIG. 6

PHASE CONTINUITY TRACKING

RELATED APPLICATION

This application was originally filed as PCT Application No. PCT/FI2022/050503, filed on Jul. 22, 2022, which claims priority from FI application No. 20215841, filed on Aug. 6, 2021, each of which is incorporated herein by reference in its entirety.

TECHNOLOGICAL FIELD

Examples of the present disclosure relate to tracking phase continuity. Some examples, though without prejudice to the forgoing, relate to tracking phase continuity for De-Modulation Reference Signals for channel estimation using Joint Channel Estimation.

BACKGROUND

One approach to enhance Uplink, UL, coverage of User Equipment, UE, of a Radio Access Network, RAN (such as 3rd Generation Partnership Project, 3GPP, New Radio, NR) is Joint Channel Estimation, JCE, for Physical Uplink Control Channel, PUSCH, which can improve channel estimation accuracy at an access node of a RAN (e.g., a gNB). Under JCE, at least one De-Modulation Reference Signal, DMRS, pilot is transmitted per slot (consecutive or non-consecutive).

However, in order to allow for JCE to take place, phase continuity across slots for JCE should be maintained at the UE side. This condition should be maintained at the UE in order for JCE operation at the gNB side (which is performed agnostically/"blindly" with respect to maintenance of phase continuity conditions at the UE side) to yield expected results.

In some circumstances, in order to achieve the benefit of JCE, it is necessary to indicate to a gNB whether or not a phase continuity criterion has been/is being met thereby informing the gNB when phase continuity cannot be ensured (and hence when JCE ought not be applied). In some circumstances it can be desirable to provide a simple/low complexity and prompt indication of phase continuity in a manner with minimal signaling overhead.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

The scope of protection sought for various embodiments of the invention is set out by the claims.

According to various, but not necessarily all, examples of the disclosure there are provided examples as claimed in the appended claims. Any [embodiments/examples] and features described in this specification that do not fall under the scope of the independent claims are to be interpreted as examples useful for understanding various embodiments of the invention.

According to at least some examples of the disclosure there is provided an apparatus comprising means for:
determining whether a coherence criterion has been met;

selecting, based at least in part on the determination, a Reference Signal, RS, arrangement; and
transmitting an RS having the selected RS arrangement. The apparatus may be a user equipment or a base station.

According to various, but not necessarily all, examples of the disclosure there is provided a method comprising:
determining whether a coherence criterion has been met;
selecting, based at least in part on the determination, a Reference Signal, RS, arrangement; and
transmitting an RS having the selected RS arrangement.

According to various, but not necessarily all, examples of the disclosure there is provided computer program instructions for causing an apparatus to perform:
determining whether a coherence criterion has been met;
selecting, based at least in part on the determination, a Reference Signal, RS, arrangement; and
transmitting an RS having the selected RS arrangement.

According to various, but not necessarily all, examples of the disclosure there is provided an apparatus comprising:
at least one processor; and
at least one memory including computer program instructions;
the at least one memory and the computer program instructions configured to, with the at least one processor, cause the apparatus at least to perform:
determining whether a coherence criterion has been met;
selecting, based at least in part on the determination, a Reference Signal, RS, arrangement; and
transmitting an RS having the selected RS arrangement.

According to various, but not necessarily all, examples of the disclosure there is provided a non-transitory computer readable medium encoded with instructions that, when performed by at least one processor, causes at least the following to be perform:
determining whether a coherence criterion has been met;
selecting, based at least in part on the determination, a Reference Signal, RS, arrangement; and
transmitting an RS having the selected RS arrangement.

According to at least some examples of the disclosure there is provided an apparatus comprising means for:
receiving a Reference Signal, RS;
determining an RS arrangement of the RS; and
determining, based at least in part on the determined RS arrangement, whether a coherence criterion has been met.

According to various, but not necessarily all, examples of the disclosure there is provided a method comprising:
receiving a Reference Signal, RS;
determining an RS arrangement of the RS; and
determining, based at least in part on the determined RS arrangement, whether a coherence criterion has been met.

According to various, but not necessarily all, examples of the disclosure there is provided computer program instructions for causing an apparatus to perform:
receiving a Reference Signal, RS;
determining an RS arrangement of the RS; and
determining, based at least in part on the determined RS arrangement, whether a coherence criterion has been met.

According to various, but not necessarily all, examples of the disclosure there is provided an apparatus comprising:
at least one processor; and
at least one memory including computer program instructions;

the at least one memory and the computer program instructions configured to, with the at least one processor, cause the apparatus at least to perform:

receiving a Reference Signal, RS;

determining an RS arrangement of the RS; and determining, based at least in part on the determined RS arrangement, whether a coherence criterion has been met.

According to various, but not necessarily all, examples of the disclosure there is provided a non-transitory computer readable medium encoded with instructions that, when performed by at least one processor, causes at least the following to be perform:

receiving a Reference Signal, RS;

determining an RS arrangement of the RS; and determining, based at least in part on the determined RS arrangement, whether a coherence criterion has been met.

The following portion of this 'Brief Summary' section describes various features that can be features of any of the examples described in the foregoing portion of the 'Brief Summary' section. The description of a function should additionally be considered to also disclose any means suitable for performing that function.

In some but not necessarily all examples, the coherence criterion comprises an indication that the UE is able to maintain at least one selected from a group of:

one or more coherence properties for a previous Uplink, UL, transmission and a subsequent UL transmission;

one or more coherence properties for a previous Physical Uplink Shared Channel, PUSCH, transmission and a subsequent PUSCH transmission; and one or more coherence properties for a previous transmission of the RS and a subsequent transmission of the RS.

In some but not necessarily all examples, the coherence criterion comprises at least one selected from a group of:

a phase continuity criterion;

an indication that the UE is able to maintain substantially the same phase for transmission of a previous transmission and a current or an upcoming transmission; and an indication that the UE is able to maintain substantially the same phase for a transmission in a previous slot, and a transmission in a current or an upcoming slot.

In some but not necessarily all examples, the RS comprises at least one selected from a group of:

an RS for channel estimation;

an RS for demodulation of at least one physical channel;

an RS transmitted over a Physical Uplink Shared Channel, PUSCH;

an RS transmitted over a Physical Downlink shared Channel, PDSCH; and a De-Modulation Reference Signal, DMRS.

In some but not necessarily all examples, selecting, based at least in part on the determination, the RS arrangement comprises selecting, based at least in part on the determination, one of: a first RS arrangement and a second RS arrangement.

In some but not necessarily all examples, at least one selected from a group of:

the first RS arrangement and/or the second RS arrangement is pre-determined; the first RS arrangement is different from the second RS arrangement;

one of the first and second RS arrangements is based, at least in part, on a cyclic shift of the other of the first and second RS arrangements; or one of the first and second RS arrangements is based, at least in part, on an adjustment of a sequence mapping of the other of the first and second RS arrangements.

In some but not necessarily all examples, one of the first and second RS arrangements is associated with the coherence criterion being met; and, consequently to determining that the coherence criterion has been met, the one of the first and second RS arrangements is selected.

In some but not necessarily all examples, an association as to which of the first and/or second RS arrangements are respectively associated with the coherence criterion being met and not met is, at least one selected from a group of:

pre-defined;

statically hard coded in a specification;

semi-statically conveyed via signalling; and dynamically conveyed via signalling.

While the above examples of the disclosure and optional features are described separately, it is to be understood that their provision in all possible combinations and permutations is contained within the disclosure. Also, it is to be understood that various examples of the disclosure can comprise any or all of the features described in respect of other examples of the disclosure, and vice versa.

BRIEF DESCRIPTION OF THE DRAWINGS

Some examples will now be described with reference to the accompanying drawings in which:

FIG. 4 shows another example of the subject matter described herein;

FIG. 5 shows another example of the subject matter described herein;

FIG. 6 shows another example of the subject matter described herein;

Figures 1, 2, 3A, 3B:
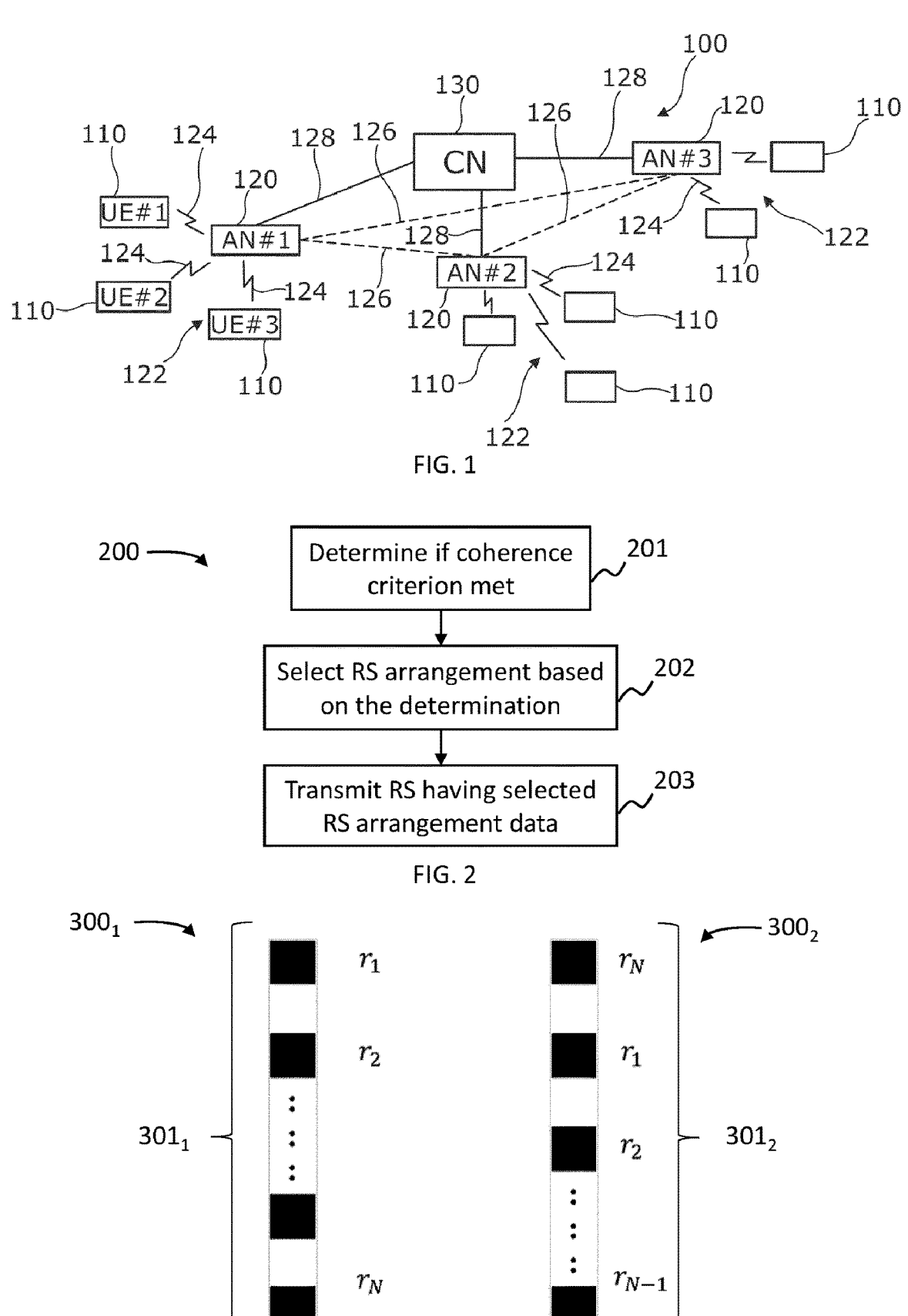
FIG. 1 shows an example of the subject matter described herein.
FIG. 2 shows another example of the subject matter described herein.
FIGS. 3A and 3B show another example of the subject matter described herein.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

In the drawings (and description) a similar feature may be referenced by the same three-digit number. In the drawings (and description), an optional subscript to the three-digit number can be used to differentiate different instances of similar features. Therefore, a three-digit number without a subscript can be used as a generic reference and the three-digit number with a subscript can be used as a specific reference. A subscript can comprise a single digit that labels different instances. A subscript can comprise two digits including a first digit that labels a group of instances and a second digit that labels different instances in the group.

Abbreviations/Definitions

DCI Downlink Control Information

DL Downlink

DMRS De-Modulation Reference Signal
gNB gNodeB
JCE Joint Channel Estimation
NR New Radio
OLPC Open Loop Power Control
PTRS Phase Tracking Reference Signal
PUCCH Physical Uplink Control Channel
PUSCH Physical Uplink Shared Channel
RAN Radio Access Network
RRC Radio Resource Configuration
UCI Uplink Control Information
UE User Equipment
UL Uplink

DETAILED DESCRIPTION

FIG. 1 schematically illustrates an example of a network 100 comprising a plurality of network nodes including terminal nodes 110 (also referred to as User Equipment, UE), access nodes 120 and one or more core nodes 130. The terminal nodes 110 and access nodes 120 communicate with each other. The access nodes 120 communicate with the one or more core nodes 130. The one or more core nodes 130 may, in some but not necessarily all examples, communicate with each other. The one or more access nodes 120 may, in some but not necessarily all examples, communicate with each other.

The network 100 is in this example a radio telecommunications network, i.e., a Radio Access Network, RAN, in which at least some of the terminal nodes 110 and access nodes 120 communicate with each other using transmission/reception of radio waves.

The RAN 100 may be a cellular network comprising a plurality of cells 122 each served by an access node 120. The access nodes 120 comprise cellular radio transceivers. The terminal nodes 110 comprise cellular radio transceivers.

In the particular example illustrated, the network 100 is a Next Generation (NG) or New Radio (NR) network. NR is the Third Generation Partnership Project (3GPP) name for 5G technology.

The interfaces between the terminal nodes 110 and the access nodes 120 are radio interfaces 124 (e.g., Uu interfaces). The interfaces between the access nodes 120 and one or more core nodes 130 are backhaul interfaces 128 (e.g., S1 and/or NG interfaces).

Depending on the exact deployment scenario, the access nodes 120 can be RAN nodes such as NG-RAN nodes. NG-RAN nodes may be gNodeBs (gNBs) that provide NR user plane and control plane protocol terminations towards the UE. NG-RAN nodes may be New Generation Evolved Universal Terrestrial Radio Access network (E-UTRAN) NodeBs (ng-eNBs) that provide E-UTRA user plane and control plane protocol terminations towards the UE. The gNBs and ng-eNBs may be interconnected with each other by means of Xn interfaces. The gNBs and ng-eNBs are also connected by means of NG interfaces to the 5G Core (5GC), more specifically to the AMF (Access and Mobility management Function) by means of the NG-C interface and to the UPF (User Plane Function) by means of the NG-U interface. The access nodes 120 may be interconnected with each other by means of Xn interfaces 126. The cellular network 100 could be configured to operate in licensed or unlicensed frequency bands, not least such as a 60 GHz unlicensed band where beamforming is mandatory in order to achieve required coverage.

The access nodes 120 can be deployed in a NR standalone operation/scenario. The access nodes 120 can be deployed in a NR non-standalone operation/scenario. The access nodes can be deployed in a Carrier Aggregation operation/scenario. The access nodes 120 can be deployed in a dual connectivity operation/scenario, i.e., Multi Radio Access Technology—Dual Connection (MR-DC), not least for example such as:

New Radio-Evolved Universal Terrestrial Radio Access Dual Connectivity (EUTRA-NR-DC, also referred to as EN-DC), New Radio-Evolved Universal Terrestrial Radio Access Dual Connectivity (NR-EUTRA-DC, also referred to as NE-DC), Next Generation Radio Access Network Evolved Universal Terrestrial Radio Access-New Radio Dual Connectivity (NG-RAN E-UTRA-NR Dual Connectivity, also referred to as NGEN-DC), or New Radio Dual Connectivity (also referred to as NR-DC).

In such non-standalone/dual connectivity deployments, the access nodes 120 may be interconnected to each other by means of X2 or Xn interfaces, and connected to an Evolved Packet Core (EPC) by means of an S1 interface or to the 5GC by means of a NG interface.

The terminal nodes 110 are network elements in the network that terminate the user side of the radio link. They are devices allowing access to network services. The terminal nodes 110 may be referred to as User Equipment (UE), mobile terminals or mobile stations. The term 'User Equipment' may be used to designate mobile equipment comprising a smart card for authentication/encryption etc such as a subscriber identity module (SIM). In other examples, the term 'User Equipment' is used to designate mobile equipment comprising circuitry embedded as part of the user equipment for authentication/encryption such as software SIM.

The access nodes 120 are network elements in the network responsible for radio transmission and reception in one or more cells 122 to or from the terminal nodes 110. Such access nodes may also be referred to as a transmission reception points (TRP's) or base stations. The access nodes 120 are the network termination of a radio link. An access node 120 can be implemented as a single network equipment, or have a split architecture that is disaggregated/distributed over two or more RAN nodes, such as a central unit (CU), a distributed unit (DU), a remote radio head-end (RRH), using different functional-split architectures and different interfaces.

Where the access node 120 has a disaggregated (split) architecture, access node 120 can comprises one or more distributed units (gNB-DU) and a centralized unit (gNB-CU), not shown in FIG. 1. The gNB-CU is a logical node configured to host a Radio Resource Connection (RRC) layer and other layers of the access node 120. The gNB-CU controls the operation of one or more gNB-DUs. The gNB-DU is a logical node configured to host Radio Link Control (RLC) protocol layer, Medium Access Control (MAC) layer and Physical (PHY) layer of the access node 120. The gNB-DU communicates via a dedicated interface (F1) to the RRC layer hosted by the gNB-CU. One gNB-DU can support one or multiple cells 122, whereas one cell is supported by only one gNB-DU 220.

In the following description, an access node 120 will be referred to as gNB 120 and a terminal node 110 will be referred to as a UE 110.

Network coverage can be a key limiting factor for a RAN/cellular commercialized network. One method to seek to address issues of UL coverage for NR, is Supplementary UL, SUL, which utilizes an UL carrier in a lower frequency band in addition to a 5G carrier on a higher frequency band. Certain issues with SUL include the additional cost of using additional lower frequencies and the complexity added at both the UE and gNB side.

One method to seek to provide UL coverage enhancement is based on an approach referred to as JCE for PUSCH. When applying JCE, the rationale being that, by bundling DMRSs over different slots (either consecutive or non-consecutive slots), this can improve the channel estimation accuracy at the gNB, especially for the PUSCH of UEs at cell-edge. Enabling improvements in channel estimation can give rise to enhanced UL coverage.

To allow for JCE to take place, phase continuity across slots for JCE should be maintained at the UE side. This condition must be guaranteed at UE for the JCE operation at the gNB side (which is performed agnostically/"blindly" with respect to phase continuity maintenance conditions at the UE side) in order to yield the expected results.

A phase change at transmitter side (e.g., the UE side) entails a rotation of a received sample in a frequency domain at the receiver side (e.g., the gNB). In this context, conventionally, the gNB has no constructive way to detect whether such rotation is taking place. From the gNB's perspective, the evolution over time of the phase of the signals transmitted by the UE, and thus its continuity (or not), may depend on both predictable and unpredictable events/aspects, such as, but not necessarily limited to:

Predictable events/aspects (known at the gNB) such as, but not necessarily limited to:
transmit precoder phase; network-assisted timing adjustment; frequency resource allocation; transmit waveform change (Cyclic-Prefix Orthogonal Frequency Division Multiplexing↔Direct Fourier Transform spread Orthogonal Frequency Division Multiplexing [i.e., CP-OFDM↔DFT-s-OFDM]; and Downlink, DL, occasion monitoring.

Unpredictable events/aspects (unknown at gNB) such as, but not necessarily limited to:
actual transmit power at the UE (open loop power control, OLPC), UE-dependent time adjustments, impairments, and unexpected events at the Radio Frequency, RF, stage of the UE.

Predictable events may not be problematic to handle in the context of JCE, given that very specific requirements will exist in this sense. By having a specific set of rules, it may be possible to ensure that, if a suitable configuration is provided by a gNB to a UE, phase continuity across slots can be ensured by the UE.

However, transmission, Tx, power, such as $P_{0-nominal-PUSCH}$, $\alpha$ (fractional power control) is computed at the UE; the number of allocated Physical Resource Blocks, PRBs, and numerology are signalled by the gNB to the UE; and DL path loss, PL, at the UE is only measured at the UE and is not reported to the gNB. Therefore, Tx power may not be fully known at the gNB side (an indication from power headroom can be available, but not the exact PL used in the Tx power computation).

Tx power changes between UL slots due to path loss changes can lead to a non-negligible channel estimation accuracy reduction being experienced by the gNB (in turn defeating the purpose of JCE feature—which is to provide coverage extension by increasing channel estimation accuracy).

Examples of the present disclosure seek to provide a fail-safe mechanism that can be used to prevent undesired performance losses at the gNB when conditions for JCE cannot be met, e.g., inadequate/insufficient phase continuity of PUSCH transmissions over differing slots. Examples of the present disclosure seek to provide the UE with a constructive means by which to inform the gNB of any event which may have broken phase continuity, even if nominal requirements are expected to be met by PUSCH configuration.

Various examples of the present disclosure seek to provide a low complexity method to indicate whether phase continuity across multiple PUSCH transmissions is kept (or not) at the UE side, using a specific DMRS configuration/arrangement (the terms "configuration" and "arrangement" are used interchangeably in the present disclosure given their semantic equivalence in the context of DMRS transmission).

As will be discussed in further detail below, according to various examples of the present disclosure, a UE can encode an indication of phase continuity by using different DMRS configurations. For example, the UE determines which of two different DMRS arrangements (e.g., having differing cyclic shifts) is to be used for generating and transmitting DMRSs based on whether the UE has detected that phase continuity is maintained for a current/next PUSCH/DMRS transmission (i.e., as compared to a preceding PUSCH/DMRS transmission), wherein one of the two DMRS arrangements is associated with/to be used where phase continuity is met and the other of the two DMRS arrangements is associated with/to be used where phase continuity is not met. Hence, in effect, a particular cyclic shift of the DMRS arrangement is used to indicate whether phase continuity is maintained or not. In some examples, the UE can select an arrangement, from a set of two possible arrangements with same cyclic shift parameter (wherein arrangement #1 is associated with phase continuity being maintained at the UE side, and arrangement #2 is associated with phase continuity not being maintained at the UE side). The gNB can detect which of the two possible arrangements was selected and used by the UE and, based on the selected arrangement and its respective association with phase continuity being maintained or not at the UE side, the gNB can (implicitly) determine information about the maintenance of phase continuity at the UE side. Thus, in effect, the arrangement encodes information about phase continuity being maintained, or not, at the UE side.

Conventionally, cyclic shifts have been used in wireless communication systems merely for generating different/orthogonal DMRS sequences (mainly in Long-Term Evolution, LTE, and NR). In TS 36.211 (e.g., Release 15.3.0 or any other future releases, not least for NR), section 5.5.2, the cyclic shift signalled by DCI is used to generate the DMRS sequence in LTE. In TS 38.211 (e.g., Release 15.3.0 or any other future releases, not least for NR), section 5.2.2, cyclic shift is used in NR systems when generating low Peak-to-Average Power Ratio, PAPR, sequences. Such sequences are then used to generate a DMRS sequence when transform precoding is enabled (DFT-s-OFDM). Conventionally, cyclic shift may also be used for Sounding Reference Signal, SRS, comb determination. In conventional NR and LTE systems, a cyclic shift is directly signalled by the gNB (e.g., DCI based) or computed at the UE using other parameters signalled by the gNB. However, significantly, in conventional techniques the cyclic shift applied in sequence generation does not contain or include any information or indication about UE, i.e., there is no association of a particular cyclic shift applied and whether or not the UE is able to maintain phase continuity. In other words, in conventional techniques, cyclic shift is merely a parameter just used for signalling purpose and it is not used to indicate phase continuity.

Advantageously, by selection and use of DMRS arrangements for indicating phase continuity, examples of the disclosure can provide a phase continuity indication to the gNB without any increase in UL signalling overhead. The gNB detects the specific DMRS arrangement/configuration, based on which it determines whether phase continuity across slots can be assumed or not. Advantageously, information about phase continuity can become available at the gNB with no additional decoding operation. Also, information about phase continuity can become available at the gNB before the actual channel estimation takes pace. In practice, this may allow the gNB to determine whether a DMRS received in a slot should be bundled with a DMRS received in other slots (in the context of the JCE or not).

FIG. 2 schematically illustrates a flow chart of a method 200 according to an example of the present disclosure.

The component blocks of FIG. 2 are functional and the functions described can be performed by a single physical entity (such as a UE 110 or an apparatus 10 as described with reference to FIG. 5). The functions described can also be implemented by a computer program 14 (such as is described with reference to FIGS. 5 and 6).

In block 201, a determination is made as to whether a coherence criterion has been met.

In some examples, the coherence criterion comprises an indication that the UE is able to maintain one or more coherence properties for a previous Uplink, UL, transmission and a subsequent UL transmission. In some examples, the coherence criterion comprises an indication that the UE is able to maintain one or more coherence properties for a previous Physical Uplink Shared Channel, PUSCH, transmission and a subsequent PUSCH transmission. In some examples, the coherence criterion comprises an indication that the UE is able to maintain one or more coherence properties for a previous transmission (or a first transmission) of the RS and a subsequent transmission (or a second transmission) of the RS.

In some examples, the coherence criterion comprises a phase continuity criterion. In some examples, the coherence criterion comprises an indication that the UE is able to maintain substantially the same phase for transmission a previous transmission and a current or an upcoming transmission. In some examples, the coherence criterion comprises an indication that the UE is able to maintain substantially the same phase for a transmission in a previous slot, and a transmission in a current or an upcoming slot. References to 'maintaining . . . ' (e.g., maintaining continuity in the phase of transmissions within past/preceding/last slots and transmissions within current/next/future slots) relate to, for example, maintaining sufficiently similar/substantially the same continuity of phase for an intended purpose, e.g., for enabling application of JCE.

Different technologies can be used to detect if the phase is maintained or not. In some examples, a UE is able to determine/detect if it can maintain phase continuity or not based on a Power Amplifier, PA, load and different configurations of the PA.

In block 202, a Reference Signal, RS, arrangement is selected, wherein the selection is based at least in part on the determination.

In some examples, the RS comprises at least one selected from the group of:
an RS for channel estimation;
an RS for demodulation of at least one physical channel;

an RS transmitted over a Physical Uplink Shared Channel, PUSCH; and
a De-Modulation Reference Signal, DMRS.

In some examples, the RS arrangement comprises a particular configuration/sequence/structure/format of the RS. For instance, the RS arrangement may be an RS having a particular cyclic shift.

In some examples, the selection, based at least in part on the determination, of the RS arrangement comprises selecting, based at least in part on the determination, one of:
a first RS arrangement (e.g., $301_1$ as discussed below with respect to FIG. 3A), and
a second RS arrangement (e.g., $301_2$ as discussed below with respect to FIG. 3B).

In some examples, the first RS arrangement and/or the second RS arrangement is pre-determined. In some examples, the first RS arrangement is different from the second RS arrangement. In some examples, one of the first and second RS arrangements is based, at least in part, on a cyclic shift of the other of the first and second RS arrangements. In some examples, one of the first and second RS arrangements is based, at least in part, on an adjustment (e.g., shift/rotation) of a sequence mapping of the other of the first and second RS arrangements.

In some examples, one of the first and second RS arrangements is associated with the coherence criterion being met; and, consequently to determining that the coherence criterion has been met, said one of the first and second RS arrangements is selected. In some examples, the other of the first and second RS arrangements is associated with the coherence criterion not being met; and, consequently to determining that the coherence criterion has not been met, said other of the first and second RS arrangements is selected.

In some examples, an association as to which of the first and/or second RS arrangements are respectively associated with the coherence criterion being met and not met is:
pre-defined;
statically hard coded in a specification;
semi-statically conveyed via signalling (e.g., via higher-layer signalling not least such as via one or more Radio Resource Configuration, RRC messages); and/or
dynamically conveyed via signalling (e.g., via L1 signalling not least such as via Downlink Control Information, DCI).

In block 203, an RS, having the selected RS arrangement, is transmitted. For example, following the selection of the RS arrangement, an RS is generated in accordance with the selected arrangement and the generated RS (having the selected arrangement) is transmitted. In some examples, the RS (having the selected arrangement) is transmitted over one or more differing slots, which would be consecutive or non-consecutive slots.

FIG. 3A schematically illustrates an example of an RS $300_1$, having a particular RS arrangement $301_1$ of a reference signal sequence r(n). One of examples of the references signal sequence r(n) is defined in section 6.4.1.1.1 of TS 38.211 (for transform precoding enabled or disabled). An equation of r(n) is set out in section 6.4.1.1.1 of TS 38.211. The parameters or information for configuring the reference signal sequence r(n) may be transmitted to the UE.

In this particular example, the RS $300_1$ is a first DMRS and the RS arrangement $301_1$ is a first DMRS arrangement. The first DMRS arrangement comprises of a particular sequence rotation before mapping DMRS samples to subcarriers.

FIG. 3B schematically illustrates another example of an RS $300_2$ having another, differing, particular RS arrangement $301_2$. In this particular example, the RS $300_2$ is a second DMRS and the RS arrangement $301_2$ is a second DMRS arrangement. The second DMRS arrangement comprises of a particular sequence rotation before mapping DMRS samples to sub-carriers that differs from that of the first DMRS arrangement.

FIG. 3A shows a Type1, 1-port DMRS sequence. Such a sequence may be associated as being a "default" or first DMRS sequence that is associated with the condition that phase continuity of PUSCH transmissions is maintained.

FIG. 3B shows a Type1, 1-port DMRS sequence with cyclic shift (i.e., a sequence mapping shift). Such a sequence may be associated as being a "specific" or second DMRS sequence that is associated with the condition that phase continuity of PUSCH transmissions is not maintained.

Applying cyclic shifts to the first and second DMRS arrangements (i.e., to identifiably distinguish them from one another and hence enable the use of one DMRS arrangement as opposed to another DMRS arrangement to serve as an indicator—i.e., as to whether phase continuity is maintained) does not entail any resource wastage or require additional resource elements.

It is to be appreciated that other differing arrangements could be applied, not least the amount of shift/rotation of the cyclic shift/rotation. In an alternative arrangement, a shift by 1 sub-carrier is applied (e.g., where Multi-User Multiple-Input, Multiple-Output, MU-MIMO, is disabled). However, such a shift by 1 sub-carrier may use more resource elements. In another alternative, a different cyclic shift value is used in DMRS generation and the cyclic shift value is associated to phase continuity (e.g., setting a cyclic shift value whose value is used to quantify a level of phase continuity). However, this alternative may lead to less orthogonality between sequences.

FIG. 4 schematically illustrates a flow chart of a method 400 according to an example of the present disclosure. The component blocks of FIG. 4 are functional and the functions described can be performed by a single physical entity (such as a gNB 120 or an apparatus as described with reference to FIG. 5). The functions described can also be implemented by a computer program 14 (such as is described with reference to FIG. 5 or 6).

In block 401, an RS is received. The RS can correspond to the RS transmitted in block 203 of FIG. 2, i.e., such that the RS has a particular selected RS arrangement whose selection is dependent on whether a coherence criterion has been met by the device that transmitted the RS (e.g., the UE 110).

In block 402, the particular RS arrangement of the RS is determined.

In block 403, a determination is made as to whether the coherence criterion has been met based on the determined arrangement of the RS. For instance, there may be (at least) two possible RS arrangements:

a first/default RS arrangement which can be pre-determined/pre-defined as being associated with the coherence criterion being met (wherein the UE would only select the first/default RS arrangement if the UE determined that it was able to meet the coherence criterion); and a second/non-default RS arrangement, which can be pre-determined/pre-defined as being associated with the coherence criterion not being met (wherein the UE would only select the second/non-default RS arrangement if the UE determined that it was unable to meet the coherence criterion).

Such that upon determination of the first/default RS arrangement or second/non-default RS arrangement, it can be established whether the coherence criterion was or was not met.

In block 404, an action is taken responsive to the determination as to whether the coherence criterion has or has not been met. In this case, an adjustment of JCE may be performed, not least for example continuing or stopping JCE.

The blocks illustrated in FIGS. 2 and 4 can represent actions in a method, functionality performed by an apparatus, and/or sections of instructions/code in a computer program.

It will be understood that each block and combinations of blocks illustrated in FIGS. 2 and 4, as well as the further functions described below with respect to FIGS. 7 and 8, can be implemented by various means, such as hardware, firmware, and/or software including one or more computer program instructions. For example, one or more of the functions described can be performed by a duly configured apparatus (such as a UE 110 or gNB 120), comprising means for performing the described functions. Furthermore, one or more of the functions described can be embodied by a duly configured computer program (such as a computer program comprising computer program instructions which embody the functions described below and which can be stored by a memory storage device and performed by a processor).

As will be appreciated, any such computer program instructions can be loaded onto a computer or other programmable apparatus (i.e., hardware) to produce a machine, such that the instructions when performed on the programmable apparatus create means for implementing the functions specified in the blocks. These computer program instructions can also be stored in a computer-readable medium that can direct a programmable apparatus to function in a particular manner, such that the instructions stored in the computer-readable memory produce an article of manufacture including instruction means which implement the function specified in the blocks. The computer program instructions can also be loaded onto a programmable apparatus to cause a series of operational actions to be performed on the programmable apparatus to produce a computer-implemented process such that the instructions which are performed on the programmable apparatus provide actions for implementing the functions specified in the blocks.

Various, but not necessarily all, examples of the present disclosure can take the form of a method, an apparatus or a computer program. Accordingly, various, but not necessarily all, examples can be implemented in hardware, software or a combination of hardware and software.

Various, but not necessarily all, examples of the present disclosure are described using flowchart illustrations and schematic block diagrams. It will be understood that each block (of the flowchart illustrations and block diagrams), and combinations of blocks, can be implemented by computer program instructions of a computer program. These program instructions can be provided to one or more processor(s), processing circuitry or controller(s) such that the instructions which execute on the same create means for causing implementing the functions specified in the block or blocks, i.e., such that the method can be computer implemented. The computer program instructions can be executed by the processor(s) to cause a series of operational steps/actions to be performed by the processor(s) to produce a computer implemented process such that the instructions which execute on the processor(s) provide steps for implementing the functions specified in the block or blocks.

Accordingly, the blocks support: combinations of means for performing the specified functions; combinations of actions for performing the specified functions; and computer program instructions/algorithm for performing the specified functions. It will also be understood that each block, and combinations of blocks, can be implemented by special purpose hardware-based systems which perform the specified functions or actions, or combinations of special purpose hardware and computer program instructions.

Various, but not necessarily all, examples of the present disclosure provide both a method and corresponding apparatus comprising various modules, means or circuitry that provide the functionality for performing/applying the actions of the method. The modules, means or circuitry can be implemented as hardware, or can be implemented as software or firmware to be performed by a computer processor. In the case of firmware or software, examples of the present disclosure can be provided as a computer program product including a computer readable storage structure embodying computer program instructions (i.e., the software or firmware) thereon for performing by the computer processor.

FIG. 5 schematically illustrates a block diagram of an apparatus 10 for performing the methods, processes, procedures and signaling described in the present disclosure and illustrated in FIGS. 2, 4, 7 and 8. In this regard, in some examples the apparatus can perform the roles of a UE 110 and in other examples it can perform the role of a gNB 120 in the illustrated and described methods. The component blocks of FIG. 5 are functional and the functions described can be performed by a single physical entity.

The apparatus comprises a controller 11, which could be provided within a device such as a UE 110 or a gNB node 120.

The controller 11 can be embodied by a computing device, not least such as those mentioned above. In some, but not necessarily all examples, the apparatus can be embodied as a chip, chip set or module, i.e., for use in any of the foregoing. As used here 'module' refers to a unit or apparatus that excludes certain parts/components that would be added by an end manufacturer or a user.

Implementation of the controller 11 can be as controller circuitry. The controller 11 can be implemented in hardware alone, have certain aspects in software including firmware alone or can be a combination of hardware and software (including firmware).

The controller 11 can be implemented using instructions that enable hardware functionality, for example, by using executable instructions of a computer program 14 in a general-purpose or special-purpose processor 12 that can be stored on a computer readable storage medium 13, for example memory, or disk etc, to be executed by such a processor 12.

The processor 12 is configured to read from and write to the memory 13. The processor 12 can also comprise an output interface via which data and/or commands are output by the processor 12 and an input interface via which data and/or commands are input to the processor 12. The apparatus can be coupled to or comprise one or more other components 15 (not least for example: a radio transceiver, sensors, input/output user interface elements and/or other modules/devices/components for inputting and outputting data/commands).

The memory 13 stores a computer program 14 comprising computer program instructions (computer program code) that controls the operation of the apparatus 10 when loaded into the processor 12. The computer program instructions, of the computer program 14, provide the logic and routines that enables the apparatus to perform the methods, processes and procedures described in the present disclosure and illustrated in FIGS. 2, 4, 7 and 8. The processor 12 by reading the memory 13 is able to load and execute the computer program 14.

Although the memory 13 is illustrated as a single component/circuitry it can be implemented as one or more separate components/circuitry some or all of which can be integrated/removable and/or can provide permanent/semi-permanent/dynamic/cached storage.

Although the processor 12 is illustrated as a single component/circuitry it can be implemented as one or more separate components/circuitry some or all of which can be integrated/removable. The processor 12 can be a single core or multi-core processor.

The apparatus can include one or more components for effecting the methods, processes and procedures described in the present disclosure and illustrated in FIGS. 2, 4, 7 and 8. It is contemplated that the functions of these components can be combined in one or more components or performed by other components of equivalent functionality. The description of a function should additionally be considered to also disclose any means suitable for performing that function. Where a structural feature has been described, it can be replaced by means for performing one or more of the functions of the structural feature whether that function or those functions are explicitly or implicitly described.

Although examples of the apparatus have been described above in terms of comprising various components, it should be understood that the components can be embodied as or otherwise controlled by a corresponding controller or circuitry such as one or more processing elements or processors of the apparatus. In this regard, each of the components described above can be one or more of any device, means or circuitry embodied in hardware, software or a combination of hardware and software that is configured to perform the corresponding functions of the respective components as described above.

The apparatus can, for example, be a client device, a server device, a mobile cellular telephone, a base station in a mobile cellular telecommunication system, a wireless communications device, a hand-portable electronic device, a location/position tag, a hyper tag etc. The apparatus can be embodied by a computing device, not least such as those mentioned above. However, in some examples, the apparatus can be embodied as a chip, chip set or module, i.e., for use in any of the foregoing.

In one example, the apparatus is embodied on a hand held portable electronic device, such as a mobile telephone, wearable computing device or personal digital assistant, that can additionally provide one or more audio/text/video communication functions (for example tele-communication, video-communication, and/or text transmission (Short Message Service (SMS)/Multimedia Message Service (MMS)/emailing) functions), interactive/non-interactive viewing functions (for example web-browsing, navigation, TV/program viewing functions), music recording/playing functions (for example Moving Picture Experts Group-1 Audio Layer 3 (MP3) or other format and/or (frequency modulation/amplitude modulation) radio broadcast recording/playing), downloading/sending of data functions, image capture function (for example using a (for example in-built) digital camera), and gaming functions.

In examples where the apparatus is provided within a UE 110, the apparatus comprises:

at least one processor 12; and at least one memory 13 including computer program code the at least one memory 13 and the computer program code configured to, with the at least one processor 12, cause the apparatus at least to perform:

determining whether a coherence criterion has been met;

selecting, based at least in part on the determination, a Reference Signal, RS, arrangement; and transmitting an RS having the selected RS arrangement.

In examples where the apparatus is provided within a gNB 120, the apparatus comprises:

at least one processor 12; and at least one memory 13 including computer program code the at least one memory 13 and the computer program code configured to, with the at least one processor 12, cause the apparatus at least to perform:

receiving a Reference Signal, RS;

determining an RS arrangement of the RS; and determining, based at least in part on the determined RS arrangement, whether a coherence criterion has been met.

According to some examples of the present disclosure, there is provided a system (for example at least one UE 110 and a gNB 120).

The above described examples find application as enabling components of: tracking systems, automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things (IOT); Vehicle-to-everything (V2X), virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility.

FIG. 6, illustrates a computer program 14 conveyed via a delivery mechanism 20. The delivery mechanism 20 can be any suitable delivery mechanism, for example, a machine-readable medium, a computer-readable medium, a non-transitory computer-readable storage medium, a computer program product, a memory device, a solid-state memory, a record medium such as a Compact Disc Read-Only Memory (CD-ROM) or a Digital Versatile Disc (DVD) or an article of manufacture that comprises or tangibly embodies the computer program 14. The delivery mechanism can be a signal configured to reliably transfer the computer program. An apparatus can receive, propagate or transmit the computer program as a computer data signal.

In certain examples of the present disclosure, there is provided computer program instructions for causing a UE 110 to perform at least the following or for causing performing at least the following:

determining whether a coherence criterion has been met;

selecting, based at least in part on the determination, a Reference Signal, RS, arrangement; and transmitting an RS having the selected RS arrangement.

In certain examples of the present disclosure, there is provided computer program instructions for causing a gNB 120 to perform at least the following or for causing performing at least the following:

receiving a Reference Signal, RS;

determining an RS arrangement of the RS; and determining, based at least in part on the determined RS arrangement, whether a coherence criterion has been met.

References to 'computer program', 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' can refer to one or more or all of the following:

(a) hardware-only circuitry implementations (such as implementations in only analog and/or digital circuitry); and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions; and (c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

Figure 7:
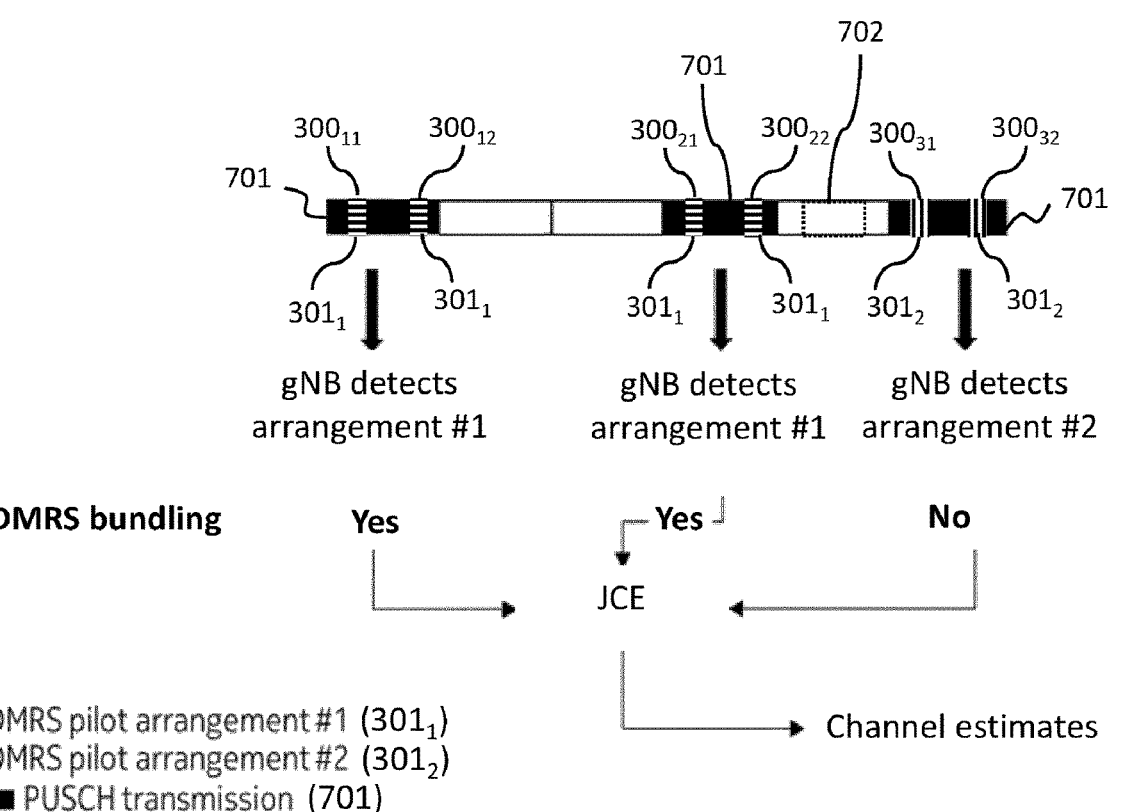
FIG. 7 shows another example of the subject matter described herein.

FIG. 7 schematically illustrates several 6 slots, the first, fourth and sixth of which comprises a PUSCH transmission 701 from a UE (not shown). A DL occasion 702 occurs in the fifth slot.

In the example shown, the PUSCH transmission 701 of the first slot comprises DMRSs $\mathbf{300}_{11}$ and $\mathbf{300}_{12}$ that have a first (default) DMRS pilot arrangement $\mathbf{301}_1$. A gNB determines the arrangements of the DMRS (i.e., similar to block 402 of FIG. 4), namely both having the first (default) DMRS pilot arrangement $\mathbf{301}_1$.

The next PUSCH transmission, in the fourth slot, comprises DMRSs $\mathbf{300}_{21}$ and $\mathbf{300}_{22}$ that have been selected, by the UE, to have the same DMRS arrangement as in the previous PUSCH transmission (since the UE had determined that phase continuity had been maintained), namely the first (default) DMRS pilot arrangement $\mathbf{301}_1$. The gNB determines that the DMRSs have the same (default) DMRS arrangement (i.e., similar to block 402 of FIG. 4). Based on this, the gNBs determines that phase continuity for the DMRSs $\mathbf{300}_{21}$ and $\mathbf{300}_{22}$ is maintained (i.e., similar to block 403 of FIG. 4) and hence that DMRS bundling can be performed and moreover that JCE can be applied (i.e., similar to block 404 of FIG. 4) in order to carry out channel estimation measurements.

The next PUSCH transmission, in the sixth slot, comprises DMRSs $\mathbf{300}_{31}$ and $\mathbf{300}_{32}$ that have been selected, by the UE, to have a differing DMRS arrangement to that of the previous DMRSs of the previous PUSCH transmission (since the UE had determined that phase continuity had not been maintained), namely a second (non-default) DMRS pilot arrangement $\mathbf{301}_2$. The gNB determines that the DMRSs have differing DMRS arrangements (i.e., similar to block 402 of FIG. 4). Based on this, the gNBs determines that phase continuity for the DMRSs $\mathbf{300}_{31}$ and $\mathbf{300}_{32}$ is not maintained with respect to the previous DMRSs (i.e., similar to block 403 of FIG. 4) and hence that DMRS bundling should not be performed and moreover that JCE should not be applied (i.e., similar to block 404 of FIG. 4) in order to carry out channel estimation measurements.

A sequence of operations according to an example of the present disclosure will now be described.

Step 1: A specific, or first, DMRS arrangement is provided to the UE. This can be provided in:
  a) a static way (e.g., by the DMRS arrangement being hard-coded in the specification),
  b) a semi-static way (e.g., by the DMRS arrangement being provided via higher-layer signalling such as RRC), and/or
  c) a dynamic way (e.g., by the DMRS arrangement being provided via DCI).

Step 2a: If phase continuity is maintained, the UE transmits PUSCH applying either the default or the specific, or the first, DMRS arrangement.

Step 2b: If phase continuity is not maintained, the UE transmits PUSCH applying the other arrangement (i.e., the specific arrangement if the default was used when phase continuity was maintained, or vice versa) or a second DMRS arrangement.

Step 3: Upon PUSCH reception by the gNB, the gNB applies a sequence detection function (for instance, this can trivially be a correlation function) and determines which of the two possible candidate arrangements have been used by the UE. Based on the determination, the gNB assesses whether phase continuity has been maintained or not. If phase continuity is not maintained for the concerned slot, the DMRS therein are not used for JCE and instead per-slot channel estimation occurs for the slot itself. For example, referring to FIG. 7, the DM-RSs $\mathbf{300}_{11}$ and $\mathbf{300}_{12}$ and the DM-RSs $\mathbf{300}_{21}$ and $\mathbf{300}_{22}$ are used for the JCE but the DM-RS $\mathbf{300}_{31}$ and $\mathbf{300}_{32}$ are not used for the JCE, and the DM-RS $\mathbf{300}_{31}$ and $\mathbf{300}_{32}$ are used for slot channel estimation for the sixth slot.

Figure 8:
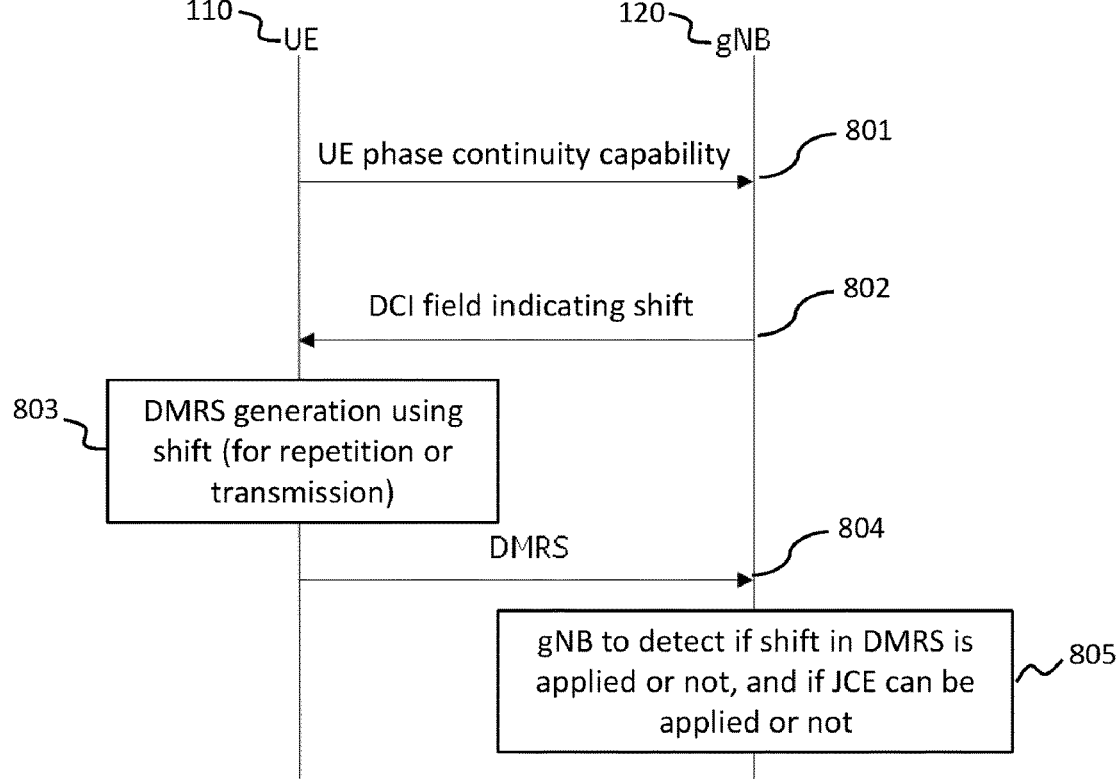
FIG. 8 shows another example of the subject matter described herein.

FIG. 8 is a signalling diagram/flow chart of signalling DMRS arrangement using a DCI-based solution (i.e., which corresponds to the above-mentioned option c) of Step 1—wherein the DMRS arrangement is provided in a dynamic way via DCI).

A UE 110 sends a UE phase continuity capability message 801 to a gNB 120. The message can inform the gNB of the UE's capability/compatibility and/or ability to perform the above-described phase continuity indication procedure.

The gNB 110 then sends, via PDCCH/PDSCH 802, a DCI field indicating a shift for DMRSs. The gNB can indicate to the UE, by DCI, which two DMRS arrangements should be used, e.g., a first/default one to use when the UE determines that phase continuity is maintained, and another different/second/non-default DMRS arrangement to use when the UE determines that phase continuity is not maintained. The second DMRS arrangement could be a specific arrangement that itself is selected based on Physical Resource Block, PRB, allocation. For example, for low PRB allocation $r_N$, $r_{N-1}, \ldots r_1$ can be better than $r_N, r_1, \ldots, r_{N-1}$. Thus, the ability to provide dynamic configuration/selection of the DMRS arrangement, e.g., by signalling the same via DCI, can ensure higher detection capability for DMRS. By contrast, where the DMRS arrangement(s) (i.e., for the first and/or second DMRS arrangements to be used) is provided in a semi-static way, e.g., via RRC, (which corresponds to the above-mentioned option b) of Step 1), in RRC configuration only one specific rotation may be used for a specific arrangement whatever the PRB, Modulation and Coding Scheme, MCS, or other prevailing operational factors/characteristics.

In block 803, the UE performs steps similar to those of blocks 201-202 of FIG. 2 and generates DMRS's using the shift (for repetition or transmission), in dependence on whether the UE is able to maintain continuity of phase.

The UE transmits the generated DMRS in transmission 804 (similar to block 203 of FIG. 2).

In block 805, the gNB performs steps similar to those of blocks 402-404 of FIG. 4 to detect if the signalled shift has been applied to the received DMRSs or not and hence whether JCE can be applied or not.

In some examples, where the DMRS arrangement(s) (i.e., for the first and/or second DMRS arrangements to be used) is/are provided in either a static way (via hard coding in the specification) or a semi-static way (via RRC) [i.e., as per the above-mentioned options a) and b) of Step 1)]. In such a manner, the UE can be aware of which two DMRS arrangements should be used (e.g., a first/default one to use when the UE determines that phase continuity is maintained, and another different/second/non-default DMRS arrangement to use when the UE determines that phase continuity is not maintained). One of the two DMRS arrangements (e.g., the first DMRS arrangement) could be a default DMRS arrangement as defined/specified in 3GPP Release 15, 16 or a future release. In examples where option a) or b) is implemented no information may be needed in DCI, i.e., examples can be implement using option a), or b) or c). In other examples, combination of options may be used, for example information of a specific DMRS arrangement to be used provided dynamically over DCI could be used to "override" a previously statically or semi-statically indication of a default DMRS arrangement to be used.

As discussed above, various examples of the disclosure, specific DMRS arrangements are used when generating a DMRS (i.e., by sequence mapping shift/rotation) in order to indicate whether phase continuity is maintained or not. Such specific DMRS arrangements are known at the UE by one or more of the following three ways:

statically hard coded in the specification;

semi-statically conveyed through higher-layer signaling (e.g., RRC);

dynamically conveyed via L1 signaling (e.g., DCI as per FIG. 8).

The first two options do not impact PDCCH coverage and may be preferable if the latter is observed to be insufficient. However, they offer no (i.e., for the hard coded option) or very small flexibility (i.e., for the semi-static option) to the gNB to optimize the specific DMRS arrangement to achieve desired robustness targets for the DMRS, e.g., reduce the false alarm detection of a default arrangement with respect to a specific arrangement. Conversely, if dynamic signalling is used (e.g., DCI), an optimal DMRS arrangement can be communicated to the UE (subject to DMRS detectability constraints) to achieve desired robustness targets. This possibility can be particularly useful when a very low number of Physical Resource Blocks, PRBs, are allocated for PUSCH—in which case a false alarm probability can be non-negligible.

A default DMRS arrangement can be used by the UE if phase continuity is maintained. Conversely, the specific DMRS arrangement can be used by the UE otherwise. Upon PUSCH reception, the gNB can detect which arrangement has been selected/used by the UE, where only two candidate arrangement hypotheses exist (which is a relatively low-complexity process that the gNB could already able to handle de facto). As result, the gNB can immediately determine if phase continuity has been maintained or not, and whether to prepare for JCE operation (or not).

Various examples may provide the following technical advantages. At the UE side, no additional complex operations need to be performed. Accordingly, complexity increase at the UE is negligible. At the gNB side, a sequence detection-based solution from a set of two possible candidates would involve merely a low complexity implementation and hence require low additional computation at the gNB side (and indeed exists already—albeit in different forms—for other applications, e.g., 2-step Random-Access Channel, RACH).

Various examples may also provide the technical advantage in not requiring any additional overhead in UL. With regards to DL overhead, this would depend on how the solution is specified/implemented. Certain implementations could be provided with no DL overhead increase (e.g., the if the "hard-coded" option a) approach is adopted), or there could be a low and "modular" DL overhead increase in case of semi-static or dynamic implementations (e.g., the options b) or c) are adopted). The adjective "modular" is referred to above since the actual DL overhead could range between 1 or 2-3 bits, depending on how many different DMRS arrangements options are specified. In all these cases, the DL overhead increase would be very small, if any, as compared to current techniques.

Various examples may also provide one or more of the following technical advantages:

no UL overhead increase for reporting phase continuity indication ability for real-time information on phase continuity to be available at the gNB, before the channel estimation is applied, while accounting for both predictable (easy) and unpredictable (hard) phase continuity disruption events no requirement to decode UCI for applying JCE for PUSCH, i.e., hardware resources such as Reed Muller or Polar decoder are not needed thereby facilitating implementation at the gNB side Although specific terms are employed herein, they are used in a generic and descriptive sense only and not for purposes of limitation. Features described in the preceding description can be used in combinations other than the combinations explicitly described. Although functions have been described with reference to certain features, those functions can be performable by other features whether described or not. Although features have been described with reference to certain examples, those features can also be present in other examples whether described or not. Accordingly, features described in relation to one example/aspect of the disclosure can include any or all of the features described in relation to another example/aspect of the disclosure, and vice versa, to the extent that they are not mutually inconsistent. Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X can comprise only one Y or can comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example', 'can' or 'may' in the text denotes, whether explicitly stated or not, that such features or functions are present in at least the described example, whether described as an example or not, and that they can be, but are not necessarily, present in some or all other examples. Thus 'example', 'for example', 'can' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X can comprise only one Y or can comprise more than one Y unless the context clearly indicates the contrary. If it is intended to use 'a' or 'the' with an exclusive meaning then it will be made clear in the context. In some circumstances the use of 'at least one' or 'one or more' can be used to emphasise an inclusive meaning but the absence of these terms should not be taken to infer any exclusive meaning.

The presence of a feature (or combination of features) in a claim is a reference to that feature (or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

In the above description, the apparatus described can alternatively or in addition comprise an apparatus which in some other examples comprises a distributed system of apparatus, for example, a client/server apparatus system. In examples where an apparatus provided forms (or a method is implemented as) a distributed system, each apparatus forming a component and/or part of the system provides (or implements) one or more features which collectively implement an example of the present disclosure. In some examples, an apparatus is re-configured by an entity other than its initial manufacturer to implement an example of the present disclosure by being provided with additional software, for example by a user downloading such software, which when executed causes the apparatus to implement an example of the present disclosure (such implementation being either entirely by the apparatus or as part of a system of apparatus as mentioned hereinabove).

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims can be suitably combined in any manner apparent to one of ordinary skill in the art. Separate references to an "example", "in some examples" and/or the like in the description do not necessarily refer to the same example and are also not mutually exclusive unless so stated and/or except as will be readily apparent to those skilled in the art from the description. For instance, a feature, structure, process, step, action, or the like described in one example may also be included in other examples, but is not necessarily included.

Each and every claim is incorporated as further disclosure into the specification and the claims are embodiment(s) of the present disclosure. Further, while the claims herein are provided as comprising specific dependencies, it is contemplated that any claims can depend from any other claims and that to the extent that any alternative embodiments can result from combining, integrating, and/or omitting features of the various claims and/or changing dependencies of claims, any such alternative embodiments and their equivalents are also within the scope of the disclosure.

We claim:

1. A User Equipment (UE) comprising:
at least one processor; and
at least one memory including computer program instructions;
the at least one memory and the computer program instructions being configured to, with the at least one processor, cause the UE to perform:
transmit, to a network node, a UE phase continuity capability message comprising information defining an ability of the UE to perform selection between different Reference Signal arrangements to indicate a phase continuity status;
receive, from the network node, a Downlink Control Information (DCI) field including a first RS arrangement and a second RS arrangement, wherein the DCI field defines a shift parameter for generating the second RS arrangement from the first RS arrangement;
determine whether a coherence criterion has been met, wherein:
  the coherence criterion comprises a phase continuity criterion for maintaining the same phase for a previous Physical Uplink Shared Channel (PUSCH) transmission and a subsequent PUSCH transmission,
  the previous PUSCH transmission and the subsequent PUSCH transmission occur in different slots, the different slots are non-consecutive slots,
  the determination is based, at least in part, on
  (i) a change in transmit power of the UE between the previous PUSCH transmission and the subsequent PUSCH transmission, and
  (ii) at least one of: monitoring a Downlink (DL) occasion, UE-dependent time adjustments, or impairments at a Radio Frequency (RF) stage of the UE;
based at least in part on the determination, select, one of the first RS arrangement and the second RS arrangement, wherein:
  the first RS arrangement is different from the second RS arrangement,
  one of the first and second RS arrangements comprises a cyclic shift of the other of the first and second RS arrangements, the first RS arrangement is associated with the coherence criterion being met and the second RS arrangement is associated with the coherence criterion not being met, the cyclic shift comprises mapping a last sample of a reference signal sequence to a first sub-carrier, the cyclic shift is applied to a sequence mapping of the reference signal sequence before mapping samples of the reference signal sequence to sub-carriers, and the reference signal sequence is a Type 1, 1-port De-Modulation Reference Signal (DMRS) sequence; and transmit an RS having the selected RS arrangement as part of a DMRS within the subsequent PUSCH transmission.

2. The UE of claim 1, wherein the second RS arrangement is selected by the network node from a plurality of candidate second RS arrangements and indicated to the UE in the DCI field, and wherein the plurality of candidate second RS arrangements is pre-configured at the UE via higher-layer signaling.

3. The UE of claim 2, wherein the first RS arrangement is a default De-Modulation Reference Signal (DMRS) arrangement defined in a 3GPP specification, and wherein the second RS arrangement is associated with per-slot channel estimation for the subsequent PUSCH transmission at the network node instead of joint channel estimation.

4. The UE of claim 3, wherein the determination further comprises determining that the coherence criterion has not been met responsive to a downlink transmission occurring in a slot between the previous PUSCH transmission and the subsequent PUSCH transmission.

5. The UE of claim 3, wherein the determination further comprises determining that the coherence criterion has not been met responsive to at least one of:

the change in transmit power of the UE exceeding a pre-defined threshold between the previous PUSCH transmission and the subsequent PUSCH transmission; or a change in a transmit waveform from Cyclic-Prefix Orthogonal Frequency Division Multiplexing (CP-OFDM) to Direct Fourier Transform spread Orthogonal Frequency Division Multiplexing (DFT-s-OFDM), or vice-versa, between the previous PUSCH transmission and the subsequent PUSCH transmission.

6. The UE of claim 5, wherein the previous PUSCH transmission and the subsequent PUSCH transmission occur in non-consecutive slots, and wherein the second RS arrangement indicated in the DCI field is selected by the network node to optimize DMRS detectability for a low number of allocated Physical Resource Blocks (PRBs) for the subsequent PUSCH transmission.

7. The UE of claim 6, wherein the coherence criterion is determined based on a configuration or load condition of a power amplifier of the UE indicating whether phase continuity between the previous PUSCH transmission and the subsequent PUSCH transmission can be maintained.

8. The UE of claim 7, wherein the first RS arrangement corresponds to a default DMRS arrangement and the second RS arrangement corresponds to a non-default DMRS arrangement indicating that phase continuity has not been maintained.

9. The UE of claim 8, wherein the cyclic shift applied to the reference signal sequence comprises a sequence rotation prior to mapping the DMRS samples to the sub-carriers.

10. The UE of claim 9, wherein the RS having the selected RS arrangement is transmitted over a plurality of slots comprising consecutive or non-consecutive slots.

11. The UE of claim 10, wherein the DCI field dynamically configures the shift parameter to enable the network node to optimize detection of the RS arrangement based on at least one of Physical Resource Block allocation or Modulation and Coding Scheme.

12. The UE of claim 11, wherein selecting the first RS arrangement indicates to the network node that the subsequent PUSCH transmission is suitable for Joint Channel Estimation bundling with the previous PUSCH transmission.

13. A method performed by a User Equipment (UE), the method comprising:

transmitting, to a network node, a UE phase continuity capability message, wherein the UE phase continuity capability message comprises information defining the UE's ability to perform selection between different Reference Signal arrangements to indicate a phase continuity status;

receiving, from the network node, a Downlink Control Information (DCI) field, wherein the DCI field indicates a first Reference Signal (RS) arrangement and a second RS arrangement, and wherein the DCI field defines a shift parameter for generating the second RS arrangement from the first RS arrangement;

determining whether a coherence criterion has been met, wherein the coherence criterion comprises a phase continuity criterion for maintaining the same phase for a previous Physical Uplink Shared Channel (PUSCH) transmission and a subsequent PUSCH transmission, wherein the previous PUSCH transmission and the subsequent PUSCH transmission occur in different slots, the different slots are non-consecutive slots, wherein the determination is based, at least in part, on a change in transmit power of the UE between the previous PUSCH transmission and the subsequent PUSCH transmission, and wherein the determination is further based, at least in part, on at least one of: monitoring a Downlink (DL) occasion, UE-dependent time adjustments or impairments at a Radio Frequency (RF) stage of the UE;

selecting, based at least in part on the determination, one of the first RS arrangement and the second RS arrangement, wherein the first RS arrangement is different from the second RS arrangement, wherein one of the first and second RS arrangements comprises a cyclic shift of the other of the first and second RS arrangements, wherein the first RS arrangement is associated with the coherence criterion being met and the second RS arrangement is associated with the coherence criterion not being met, wherein the cyclic shift comprises mapping a last sample of a reference signal sequence to a first sub-carrier, wherein the cyclic shift is applied to a sequence mapping of the reference signal sequence before mapping samples of the reference signal sequence to sub-carriers, and wherein the reference signal sequence is a Type 1, 1-port De-Modulation Reference Signal (DMRS) sequence; and transmitting the selected RS arrangement as part of a DMRS within the subsequent PUSCH transmission.

14. A non-transitory computer readable medium encoded with instructions that, when performed by at least one processor of a User Equipment (UE), causes the UE to perform:

transmit, to a network node, a UE phase continuity capability message, wherein the UE phase continuity capability message comprises information defining the UE's ability to perform selection between different Reference Signal arrangements to indicate a phase continuity status;

receive, from the network node, a Downlink Control Information (DCI) field, wherein the DCI field indicates a first Reference Signal (RS) arrangement and a second RS arrangement; and wherein the DCI field defines a shift parameter for generating the second RS arrangement from the first RS arrangement;

determining whether a coherence criterion has been met, wherein the coherence criterion comprises a phase continuity criterion for maintaining the same phase for a previous Physical Uplink Shared Channel (PUSCH) transmission and a subsequent PUSCH transmission, wherein the previous PUSCH transmission and the subsequent PUSCH transmission occur in different slots, the different slots are non-consecutive slots, wherein the determination is based, at least in part, on a change in transmit power of the UE between the previous PUSCH transmission and the subsequent PUSCH transmission, and wherein the determination is further based, at least in part, on at least one of: monitoring a Downlink (DL) occasion, UE-dependent time adjustments or impairments at a Radio Frequency (RF) stage of the UE;

selecting, based at least in part on the determination, one of the first RS arrangement and the second RS arrangement, wherein the first RS arrangement is different from the second RS arrangement, wherein one of the first and second RS arrangements comprises a cyclic shift of the other of the first and second RS arrangements, wherein the first RS arrangement is associated with the coherence criterion being met and the second RS arrangement is associated with the coherence criterion not being met, wherein the cyclic shift comprises mapping a last sample of a reference signal sequence to a first sub-carrier, wherein the cyclic shift is applied to a sequence mapping of the reference signal sequence before mapping samples of the reference signal sequence to sub-carriers, and wherein the reference signal sequence is a Type 1, 1-port De-Modulation Reference Signal (DMRS) sequence; and transmitting the selected RS arrangement as part of a DMRS within the subsequent PUSCH transmission.

* * * * *